United States Patent [19]

Hu et al.

[11] Patent Number: 5,487,882
[45] Date of Patent: Jan. 30, 1996

[54] PROCESS FOR PREPARATION OF ZEOLITE "X"

[75] Inventors: Patrick C. Hu; Eric W. Liimatta, both of Baton Rouge, La.

[73] Assignee: Albemarle Corporation, Richmond, Va.

[21] Appl. No.: 275,722

[22] Filed: Jul. 19, 1994

[51] Int. Cl.⁶ .................................................. C01B 39/22
[52] U.S. Cl. ................................. 423/700; 423/DIG. 21
[58] Field of Search ........................... 423/700, DIG. 21; 502/79

[56] References Cited

U.S. PATENT DOCUMENTS

| | | | |
|---|---|---|---|
| 2,958,579 | 11/1960 | McCormick et al. | 423/DIG. 21 |
| 3,425,800 | 2/1969 | Hirsh | 423/DIG. 21 |
| 3,720,756 | 3/1973 | Schwochow et al. | 423/DIG. 21 |
| 4,055,622 | 10/1977 | Christophliemk et al. | 423/700 |
| 4,400,366 | 8/1983 | Sanders et al. | 423/DIG. 21 |
| 4,406,822 | 9/1983 | Sanders et al. | 423/DIG. 21 |
| 4,587,115 | 5/1986 | Arika et al. | 502/79 |
| 4,661,334 | 4/1987 | Latourrette et al. | 423/DIG. 21 |

FOREIGN PATENT DOCUMENTS

| | | | |
|---|---|---|---|
| 0279870 | 6/1990 | Germany | 423/DIG. 21 |
| 7047713 | 3/1982 | Japan | 423/DIG. 21 |
| 7166311 | 10/1982 | Japan | 423/DIG. 21 |

*Primary Examiner*—Mark L. Bell
*Assistant Examiner*—David Sample
*Attorney, Agent, or Firm*—Philip M. Pippenger

[57] ABSTRACT

A method for producing crystalline synthetic faujasite of the zeolite "X" type is disclosed. The method comprises (a) separately preparing a sodium silicate solution and a sodium aluminate solution, (b) admixing the sodium silicate solution and the sodium aluminate solution at high shear until a mixture results having a ratio of sodium oxide to silica of 0.4:1 to 2:1, silica to alumina of 2.2:1 to 3.5:1, and water to sodium oxide of 20:1 to 70:1, (c) heating said mixture to a temperature of about 80° to 120° C. in the absence of any further mixing for a period of time sufficient to produce the desired crystalline faujasite of the zeolite "X" type, and (d) recovering said zeolite "X".

4 Claims, No Drawings

PROCESS FOR PREPARATION OF ZEOLITE "X"

FIELD OF THE INVENTION

In general, the present invention relates to the production of zeolites.

DESCRIPTION OF THE PRIOR ART

Certain naturally occurring hydrated metal aluminum silicates are called zeolites. The synthetic adsorbents of the invention have compositions similar to some of the natural zeolites. The most common of these zeolites are sodium zeolites. Zeolites are useful as detergent builders, cracking catalysts and molecular sieves.

Zeolites consist basically of a three-dimensional framework of $SiO_4$ and $AlO_4$ tetrahedra. The electrovalence of each tetrahedra containing aluminum is balanced by the inclusion in the crystal of a cation, for example, a sodium ion. This balance may be expressed by the formula $Al/Na=1$. The spaces between the tetrahedra are occupied by water molecules prior to dehydration.

Zeolites "X" and "Y" may be distinguished from other zeolites and silicates on the basis of their X-ray powder diffraction patterns and certain physical characteristics. The X-ray patterns for several of these zeolites are described below. The composition and density are among the characteristics which have been found to be important in identifying these zeolites.

The basic formula for all crystalline sodium zeolites may be represented as follows:

$$Na_2O:Al_2O_3:xSiO_2:yH_2O.$$

In general, a particular crystalline zeolite will have values for x and y that fall in a definite range. The value x for a particular zeolite will vary somewhat since the aluminum atoms and the silicon atoms occupy essentially equivalent positions in the lattice. Minor variations in the relative numbers of these atoms do not significantly alter the crystal structure or physical properties of the zeolite. For zeolite X, an average value for x is about 2.5 with the x value falling within the range 2.5±0.5.

The value of y is not necessarily an invariant for all samples of zeolites. This is true because various exchangeable ions are of different size, and, since there is no major change in the crystal lattice dimensions upon ion exchange, the space available in the pores of the zeolite to accommodate water molecules varies.

The average value for y determined for zeolite X is 6.2.

The formula for zeolite X may be written as follows:

$$0.9\pm0.2Na_2O:Al_2O_3:2.5\pm0.5SiO_2:Yh_2O;$$

"y" may be any value up to 8 for zeolite X.

The pores of zeolites normally contain water.

The above formulas represent the chemical analysis of zeolite X. When other materials as well as water are in the pores, chemical analysis will show a lower value of y and the presence of other adsorbates. The presence in the crystal lattice of materials volatile at temperatures below about 600° C., does not significantly alter the usefulness of the zeolites as an adsorbent since the pores are usually freed of such volatile materials during activation.

Among the ways of identifying zeolites and distinguishing them from other zeolites and other crystalline substances, the X-ray powder diffraction patter has been found to be a useful tool. In obtaining X-ray powder diffraction patterns, standard techniques are employed. The radiation is the K$\alpha$ doublet of copper, and a Geiger counter spectrometer with a strip chart pen recorder is used. The peak heights, I, and the positions as a function of $2\theta$ where $\theta$ is the Bragg angle, are read from the spectrometer chart. From these, the relative intensities, $100I/I_0$, where $I_0$ is the intensity of the strongest line or peak, and d the interplanar spacing in Å corresponding to the recorded lines are calculated.

X-ray powder diffraction data for sodium zeolite X are given in Table A. $100I/I_0$ and the d values in angstroms (Å) for the observed lines for zeolite X are also given. The X-ray patterns indicate a cubic unit cell of dimensions between 24.5 Å and 25.5 Å. In a separate column are listed the sum of the squares of the Miller indices ($h^2+k^2+l^2$) for a cubic unit cell that corresponds to the observed lines in the X-ray diffraction patterns. The $a_0$ value for zeolite X is 24.99 Å, where $a_0$ is the unit cell edge.

TABLE A

X-Ray Diffraction Pattern for Synthetic Faujasite (Zeolite X)

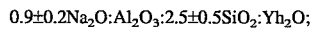

| $h^2 + k^2 + l^2$ | 100 $I/I_0$ | d (Å) |
|---|---|---|
| 3 | 100 | 14.47 |
| 8 | 18 | 8.85 |
| 11 | 12 | 7.54 |
| 19 | 18 | 5.73 |
| 27 | 5 | 4.81 |
| 32 | 9 | 4.42 |
| 35 | 1 | 4.23 |
| 40 | 4 | 3.946 |
| 43 | 21 | 3.808 |
| 44 | 3 | 3.765 |
| 48 | 1 | 3.609 |
| 51 | 1 | 3.500 |
| 56 | 18 | 3.338 |
| 59 | 1 | 3.253 |
| 67 | 4 | 3.051 |
| 72 | 9 | 2.944 |
| 75 | 19 | 2.885 |
| 80 | 8 | 2.794 |
| 83 | 2 | 2.743 |
| 88 | 8 | 2.663 |
| 91 | 3 | 2.620 |
| 96 | 1 | 2.550 |
| 108 | 5 | 2.404 |
| 123 | 1 | 2.254 |
| 128 | 3 | 2.209 |
| 131 | 3 | 2.182 |
| 136 | 2 | 2.141 |
| 139 | 2 | 2.120 |
| 144 | 1 | 2.038 |
| 164 | 1 | 1.952 |
| 168 | 1 | 1.928 |
| 184 | 1 | 1.842 |
| 195 | 1 | 1.789 |
| 200 | 2 | 1.767 |
| 211 | 3 | 1.721 |
| 243 | 3 | 1.603 |

The more significant d values for zeolite X are given in Table B.

TABLE B

MOST SIGNIFICANT d VALUES FOR ZEOLITE X
d Value of Reflection in A 14.45 ± 0.2
8.85 ± 0.1
7.55 ± 0.1
5.75 ± 0.1
4.42 ± 0.05
3.80 ± 0.05

TABLE B-continued

MOST SIGNIFICANT d VALUES FOR ZEOLITE X
d Value of Reflection in A 3.33 ± 0.05
2.88 ± 0.05
2.79 ± 0.05
2.66 ± 0.05

Occasionally, additional lines not belonging to the pattern for the zeolite appear in a pattern along with the X-ray lines characteristic of that zeolite. This is an indication that one or more additional crystalline materials are mixed with the zeolite in the sample being tested. Frequently, these additional materials can be identified as initial reactants in the synthesis of the zeolite, or as other crystalline substances. When the zeolite is heat treated at temperatures of between 100° C. and 600° C., in the presence of water vapor or other gases or vapors, the relative intensities of the lines in the X-ray pattern may be appreciably changed from those existing in the unactivated zeolite patterns. Small changes in line positions may also occur under these conditions. These changes in no way hinder the identification of these X-ray patterns as belonging to the zeolite.

The particular X-ray technique and/or apparatus employed, the humidity, the temperature, the orientation of the powder crystals and other variables, all of which are well known and understood to those skilled in the art of Xray crystallography or diffraction can cause some variations in the intensities and positions of the lines. These changes, even in those few instances where they become large, pose no problem to the skilled X-ray crystallographer in establishing identifies. Thus, the X-ray data give herein to identify the lattice for a zeolite, are not to exclude those materials, which, due to some variable mentioned or otherwise known to those skilled in the art, fail to show all of the lines, or show a few extra ones that are permissible in the cubic system of that zeolite, or show a slight shift in position of the lines, so as to give a slightly larger or smaller lattice parameter.

A simple test described in *American Mineralogist*, Vol. 28, Page 545, 1943, permits a quick check of the silicon to aluminum ratio of the zeolite. According to the description of the test, zeolite minerals with three-dimensional network that contains aluminum and silicon atoms in an atomic ratio of $Al/Si=2/3=0.67$, or greater, produce a gel when treated with hydrochloric acid. Zeolites having smaller aluminum to silicon ratios disintegrate in the presence of hydrochloric acid and precipitate silica. These tests were developed with natural zeolites and may vary slightly when applied to synthetic types.

U.S. Pat. No. 2,882,244 describes a process for making zeolite X comprising preparing a sodium-aluminum-silicate water mixture having an $SiO_2/Al_2O_3$ mole ratio of from 3:1 to 5:1, an $Na_2O/SiO_2$ mole ratio from 1.2:1 to 1.5:1, and an $H_2O/Na_2O$ mole ratio of from 35:1 to 60:1, maintaining the mixture at a temperature of from 20° C. to 120° C. until zeolite X is formed, and separating the zeolite X from the mother liquor.

In U.S. Pat. No. 3,119,659, a kaolin clay and sodium hydroxide are formed into a compact body, dried, reacted in an aqueous mixture at a temperature of from 20° C. to 175° C. until a zeolite is formed. Zeolite X is formed in a reaction mixture having an $Na_2O/SiO_2$ molar ratio of 5:1, and an $H_2O/Na_2O$ molar ratio of 30:1 to 60:1. Zeolite Y is formed in a reaction mixture having an $Na_2O/SiO_2$ molar ratio of 0.5:1, an $SiO_2/Al_2O_3$ molar ratio of 7:1, and an $H_2O/Na_2O$ molar ratio of 20:1 to 40:1.

U.S. Pat. No. 4,440,366 relates to a process for producing a crystalline synthetic faujasite wherein an activated sodium silicate system is provided by mixing a sodium silicate solution with a seed amount of the faujasite to be produced and the activated sodium silicate system is reacted with a sodium aluminate solution under controlled conditions to thereby form the desired crystalline synthetic faujasite.

DESCRIPTION OF THE PREFERRED EMBODIMENTS

Zeolite X is the name given to synthetic zeolites having the crystal structure of the naturally occurring mineral, faujasite having an $SiO_2/Al_2O_3$ ratio of less than 3.

In general, a sodium silicate solution and a sodium aluminate solution are each separately prepared. Sand is dissolved in a sodium hydroxide solution at a pressure of at least 100 psig and a temperature of at least 130° C. to produce a sodium silicate solution having a silica to sodium oxide molar ratio of between 2.0:1 and 2.8:1 for preparing zeolite X. Any other suitable process for preparing the sodium silicate solution may be used. Any suitable process for preparing the sodium aluminate solution may also be used.

The literature describing zeolite preparation always calls for adequate agitation. (During Zeolite X preparation however, agitation during zeolite crystallization can be disadvantageous). It is generally understood that continuous agitation during the zeolite crystallization process, controls the size of the particle. This is especially important for large volume commercial zeolite production, where small particle size is critical. However, according to the present invention agitation can be eliminated during the long crystallization periods of Zeolite X and still prepare Zeolite X with average particle sizes in the range of 0.5–7 microns. The particle size of the final product can be controlled by agitation in the very early stages of the Zeolite X preparation.

Preferably, the sodium silicate solution can be added to the sodium aluminate solution. The solutions can be at elevated temperatures (such as 60° C.) or at room temperature at the time of addition. Immediately after addition a fluid with foam/gel type of characteristics is formed. Due to its consistency, efficient blending is difficult. However after adequate mixing and enough time, this foam-like material breaks down into a much lower viscosity material. The viscosity of this material is related to the amount of water and the solids loading used in the reaction. For example, a reaction mixture containing 2.54% Si, 1.74% Al and 5.9% Na forms a fluid with a viscosity of about 18 cp at $100 \text{ s}^{-1}$.

The term high shear rate used in this invention means mechanical mixing with tip speeds of 200–10,000 ft/min. High shear can also be applied by high shear mixers such as pipeline mixers or colloid mills. After the low viscosity material is formed, high shear can be effectively applied to control the particle size. After the low viscosity material is produced, it is agitated under high shear for 30 seconds to 2 hours to produce particles with average sizes ranging from 0.5 to 7 microns.

The reaction mixture for zeolite X has the following molar ratios: sodium oxide to silica—0.4:1 to 2:1, silica to alumina—2.2 to 3.5:1, and water to sodium oxide—20:1 to 70:1; and preferred molar ratios of 1:3 to 1.7:1, 2.6:1 to 3.0:1, and 30:1 to 45:1, respectively, and most preferred molar ratios of 1.4:1, 2.8:1, and 36.4:1, respectively.

The system is heated to a temperature of about 80° C. to 125° C. and preferably about 90° C. to 115° C. No agitation is necessary at this time nor is it desirable because of attendant problems associated with the crystallization process, e.g., reaction plugging. The temperature is maintained until the desired crystalline synthetic faujasite is formed, normally about an hour. The oil bath heating step may be performed at temperatures of about 0° C. to 90° C. for about four to six hours. Such lower temperatures require longer heating times.

Zeolite X Production

The experimental conditions and results for those experiments where zeolite X was the desired product are listed in Table C.

The following detailed experimental procedures are examples of the above.

EXAMPLES 1-15

Examples 1-11 were carried out in the absence of agitation during the crystallization periods. The samples were prepared by pouring appropriate amounts of solution from stock solutions of sodium aluminate (3.3% Al and 6.0% Na), sodium silicate (12.8% Si and 10.2% Na), 50% NaOH and water to total 500 grams of reactants. The reactants were blended in a 1000 ml beaker using a 1½" D Cowles blade attached to a Dispermat CV. The reactants were sheared at approximately 2000 rpm until the thick gel that forms is broken into a fairly low viscosity material. The material was then sheared 5 additional minutes. The samples were then poured into glass containers and heated with no agitation at 90° C. for 60+ hours.

Examples 12-14 were prepared in the same manner as Examples 1-11. These were heated with no agitation at 115° C. for 1.5 hours.

Example 15 was prepared by pouring appropriate amounts of solution from stock solutions of sodium aluminate (3.3% Al and 6.0% Na), sodium silicate (12.8% Si and 10.2% Na), 50% NaOH and water to total 1,000 g of reactants. The reactants were blended in a 2,000 ml beaker using a 70 mm diameter Cowles blade attached to a Dispermat CV. The reactants were sheared at approximately 2000 rpm until the thick gel that forms is broken into a low viscosity material. The material was then sheared 5 additional minutes. The sample was then placed in a glass container and heated without agitation for 3.5 hours at 115° C. The following table summarizes the experimental data.

TABLE C

| Exp. No. | REACTION SUMMARY | | | | | |
| --- | --- | --- | --- | --- | --- | --- |
| | Na | Al | Si | Rxn. Temp. | Rxn. Time | Part. Size |
| 1 | 5.91 | 1.74 | 3.13 | 90 | 68 Hr | 3.42 |
| 2 | 6.11 | 1.74 | 3.13 | 90 | 68 Hr | 2.73 |
| 3 | 6.31 | 1.74 | 3.13 | 90 | 68 Hr | 6.18 |
| 4 | 5.74 | 1.74 | 2.93 | 90 | 68 Hr | 4.78 |
| 5 | 5.89 | 1.74 | 2.93 | 90 | 68 Hr | 4.16 |
| 6 | 6.09 | 1.74 | 2.93 | 90 | 68 Hr | 4.28 |
| 7 | 6.29 | 1.74 | 2.93 | 90 | 64 Hr | 4.23 |
| 8 | 5.78 | 1.69 | 3.25 | 90 | 64 Hr | 4.31 |
| 9 | 5.94 | 1.74 | 3.34 | 90 | 64 Hr | 3.95 |
| 10 | 6.14 | 1.74 | 3.34 | 90 | 64 Hr | 3.91 |
| 11 | 6.34 | 1.74 | 3.34 | 90 | 64 Hr | 3.35 |
| 12 | 5.70 | 1.74 | 3.51 | 115 | 1.5 Hr | 4.3 |
| 13 | 5.90 | 1.74 | 3.51 | 115 | 1.5 Hr | 3.1 |
| 14 | 6.10 | 1.74 | 3.51 | 115 | 1.5 Hr | 2.2 |
| 15 | 5.56 | 1.75 | 2.93 | 115 | 3.5 Hr | 6.54 |

Under no agitation, the zeolite X produced has mean particle size in the range of 2.2 to 6.53 um.

All the reactants may be blended together under high shear at room temperature and after the gel is formed, the gel can be transferred to a simple container equipped with no agitation capability for crystallization to complete. Elevated temperatures in the crystallization reactor is preferred. The incentive for this process is in lower equipment costs.

We claim:

1. A method for producing a crystalline synthetic faujasite of the zeolite "X" type comprising the steps of:
   i) separately preparing a sodium silicate solution and a sodium aluminate solution;
   ii) admixing the sodium silicate solution and the sodium aluminate solution at high shear until a mixture results having a ratio of sodium oxide to silica of 0.4:1 to 2:1; silica to alumina of 2.2:1 to 3.5:1; and water to sodium oxide of 20:1 to 70:1;
   iii) heating said mixture to a temperature of about 80° to 120° C. in the absence of any further mixing for a period of time sufficient to produce the desired crystalline faujasite of the zeolite "X" type; and
   iv) recovering said zeolite "X".

2. The method according to claim 1 wherein said high shear is produced by mechanical mixing.

3. The method according to claim 2 wherein said mechanical mixing is achieved by a blade-type device operating at a tip speed of 200–10,000 ft/min.

4. The method according to claim 1 wherein said high shear is produced by a pipeline mixer or colloid mill.

* * * * *